United States Patent
Hanson et al.

(10) Patent No.: US 8,521,572 B2
(45) Date of Patent: Aug. 27, 2013

(54) CUSTOMER CARE SUPPORT SYSTEM WITH CALL AVOIDANCE PROCESSING

(75) Inventors: Craig D. Hanson, Elk Grove, CA (US); William D. Guinn, Placerville, CA (US); Greg Verego, Atlanta, GA (US); John D'Amour, Sunnyvale, CA (US)

(73) Assignee: Amdocs Software Systems Limited, Dublin (IE)

( * ) Notice: Subject to any disclaimer, the term of this patent is extended or adjusted under 35 U.S.C. 154(b) by 425 days.

(21) Appl. No.: 12/862,550

(22) Filed: Aug. 24, 2010

(65) Prior Publication Data

US 2011/0299676 A1 Dec. 8, 2011

Related U.S. Application Data

(60) Provisional application No. 61/352,633, filed on Jun. 8, 2010.

(51) Int. Cl.
*H04M 3/00* (2006.01)
*G06Q 10/00* (2012.01)

(52) U.S. Cl.
USPC .................................. 705/7.11; 379/265.03

(58) Field of Classification Search
USPC .............. 379/88.01–88.25, 202.01; 709/204, 709/207; 707/705, 737; 715/751; 705/7.11, 705/14.1, 14.58, 26.8, 34, 400
See application file for complete search history.

(56) References Cited

U.S. PATENT DOCUMENTS

| | | | |
|---|---|---|---|
| 7,099,877 B1 * | 8/2006 | Turba et al. ........................... 1/1 |
| 7,818,223 B1 * | 10/2010 | Campbell et al. ............... 705/34 |
| 8,296,278 B2 * | 10/2012 | Abraham ...................... 707/705 |
| 2006/0026011 A1 * | 2/2006 | Verego et al. ..................... 705/1 |
| 2006/0089849 A1 * | 4/2006 | Irby et al. .......................... 705/1 |
| 2008/0040427 A1 * | 2/2008 | Shroff et al. .................. 709/204 |

OTHER PUBLICATIONS

Thorpe et al., U.S. Appl. No. 12/862,550, filed Aug. 24, 2010, for "Customer Care Support System with Call Avoidance Processing" (22 pages).
Bailin et al., U.S. Appl. No. 12/883,879, filed Sep. 16, 2010, for "Method and System for Configuring Rules for Execution" (45 pages).

* cited by examiner

*Primary Examiner* — Mohammad Islam
(74) *Attorney, Agent, or Firm* — Finnegan, Henderson, Farabow, Garrett & Dunner LLP

(57) ABSTRACT

Methods and systems for managing customer activity in a call center include monitoring event data. A mediator filters the event data into an event data set associated with a selected customer. A context component creates a context for the customer based on the event data set. A decision engine performs a probabilistic assessment of an occurrence related to the customer, based on the customer context, and determines an action based on the probabilistic assessment. An action processor initiates the action.

17 Claims, 5 Drawing Sheets

CUSTOMER CARE SUPPORT SYSTEM WITH CALL AVOIDANCE PROCESSING

RELATED APPLICATIONS

This application claims the benefit of priority to U.S. Provisional Application No. 61/352,633, filed Jun. 8, 2010, which is incorporated in its entirely herein by reference.

BACKGROUND

1. Field

This disclosure relates generally to methods and systems that monitor customer activity, and more particularly, to methods and systems for monitoring customer activity and taking proactive action in an effort to prevent customers from contacting customer call centers.

2. Background

For large businesses, customer service can be very costly. Often, companies have large organizations caring for their customer base. The organizations are generally reactive as they wait for a customer to initiate contact, and only then do the organizations take corrective action. For example, an organization may correct a customer's bill after the customer calls a call center to complain about an increased charge.

As companies move to reduce the cost of customer support, it is desirable to avoid reactive customer service, for example by taking proactive action. Even if reactive customer service can not be completely avoided, a company may want to take the initiative to contact a customer using, for example, a lower cost mechanism (e.g., electronic communications, instead of a live telephone call or physical mail), thereby reducing the overall cost of customer care.

Systems and methods consistent with the present invention address these and other shortcomings found in current customer care support systems.

SUMMARY OF THE INVENTION

A computer-implemented method for managing customer activity in a call center, consistent with aspects of the present invention, comprises: monitoring, by a computer system, event data; filtering, by the computer system, the event data into an event data set associated with a selected customer; creating, by the computer system, a context for the customer based on the event data set; performing, by the computer system, an assessment of an occurrence related to the customer, based on the context; determining, by the computer system, an action based on the probabilistic assessment; and initiating, by the computer system, the action.

A system for managing customer activity in a call center, consistent with aspects of the present invention, comprises: an event handler configured to monitor event data; a mediator configured to filter the event data into an event data set associated with a selected customer; a context component configured to create a context for the selected customer based on the event data set; a decision engine configured to: perform an assessment of an occurrence related to the selected customer, based on the context, and determine an action based on the assessment; and an action processor configured to initiate the action.

A computer-implemented method for preventing customers from contacting a call center, the method comprising: monitoring, by a computer system, event data; filtering, by the computer system, the event data into an event data set associated with a selected customer; creating, by the computer system, a context for the selected customer based on the data set; performing, by the computer system, a probabilistic assessment of the likelihood that the customer will initiate a call to the call center, based on the context; determining, by the computer system, a preemptive action intended to prevent the customer from initiating the call, based on the probabilistic assessment; and initiating, by the computer system, the preemptive action.

DETAILED DESCRIPTION

When a customer service representative knows the likely reason for a customer's call or other contact, the customer service representative has a better starting point for the conversation and may more quickly meet the customer's expectations, needs, or desires, thereby meeting business goals such as reducing call handling time, increasing customer satisfaction, and so forth. It is therefore desirable to create a system that collects events from various sources into a customer event history, augment this history using inferences, and use the augmented history to predict a reason for a customer's call or contact. For example, a customer may make a payment. The payment is evaluated as "on time," using a customer rule in an inference engine. The customer is classified as a "good payer" using inference capabilities based on a Resource Description Framework (RDF) concept model. By doing so, such a system may make predictions when the customer calls, or even before a customer calls, such as when an event happens to the customer. Such a system may save enormous business, organizational, and development costs, increase customer loyalty, and attract new customers for a business. For example, a business that preemptively corrects an overcharge on a customer's bill prior to the customer's complaint may benefit from an increase in that customer's loyalty.

Reference will now be made in detail to exemplary aspects of the invention, examples of which are illustrated in the accompanying drawings. Wherever possible, the same reference numbers will be used throughout the drawings to refer to the same or like parts.

Figure 1:
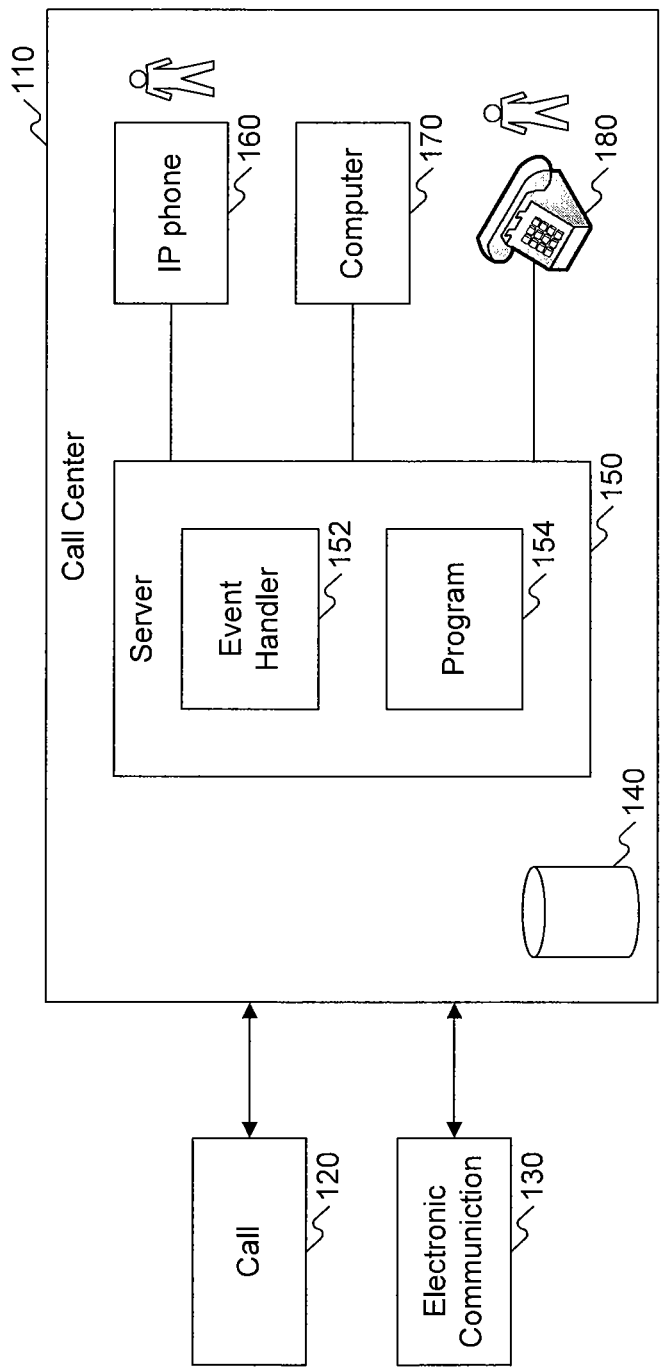
FIG. 1 is a diagram of a system for handling event data in which systems and methods consistent with aspects of the present invention may be implemented.

FIG. 1 is a diagram of an exemplary system for handling event data in which systems and methods consistent with aspects of the present invention may be implemented. The components and arrangement of FIG. 1, however, may be varied within principles of the present invention. For example, although not show, system 100 may use IVBs or ACDs to process calls or communication in call center 110.

As shown in FIG. 1, system 100 includes call center 110. Call center 110 may receive event data such as a call 120 or an electronic communication 130. For example, a customer may contact call center 110 via call 120 or electronic communication 130 to inquire about a bill. Electronic communication 130 may include, for example, an e-mail, a voice-over IP communication, or a notification from another computer system (not pictured), such as a notification that a bill was delivered to a customer.

Similarly, call center 110 may output event data such as call 120 or electronic communication 130. For example, call center 110 may call a customer to preempt a question about a bill, or may send electronic communication 130 (e.g., an email) to update a customer about the status of a bill. In certain examples, any customer activity (e.g., payment of a bill, change of address, etc.) may result in an electronic communication 130 to call center 110.

As shown in FIG. 1, call center 110 includes data store 140, server 150, phone 160, computer 170, and telephone 180. Data store 140 may comprise one or more databases that store information and are accessed and/or managed through system 100. By way of example, data store 140 may be an Oracle™ database, a Sybase™ database, other relational database system, files, HTML, or any other data store. Data store 140 may store, for example, data and information related to call 120, electronic communication 130, events, notifications, customer information, etc. Systems and methods of the present invention, however, are not limited to separate databases or even to the use of a database.

Server 150 may include event handler 152 and program 154. Event handler 152 may monitor and handle events, such as call 120 or electronic communication 130. For example, event handler 152 may monitor customer activity, such as any changes in customer data, changes in customer environment either initiated by a company or initiated by a customer, changes in the configuration of a product or service, changes in the patterns of use of a product or service, or communication between the company and the customer. Program 154 may comprise any software application configured to work with event handler 152, for example. In one example, program 154 may comprise a forward-chained rule engine to process a rule. Server 150 may also include other programs that perform other functions and processes, such as programs that provide communication support and customer activity monitoring.

Phone 160 may comprise a voice over Internet Protocol (VoIP) system. Computer 170 may comprise one or more workstations, personal computers, laptops, or other computers. Telephone 180 may comprise one or more standard telephones.

Figure 2:
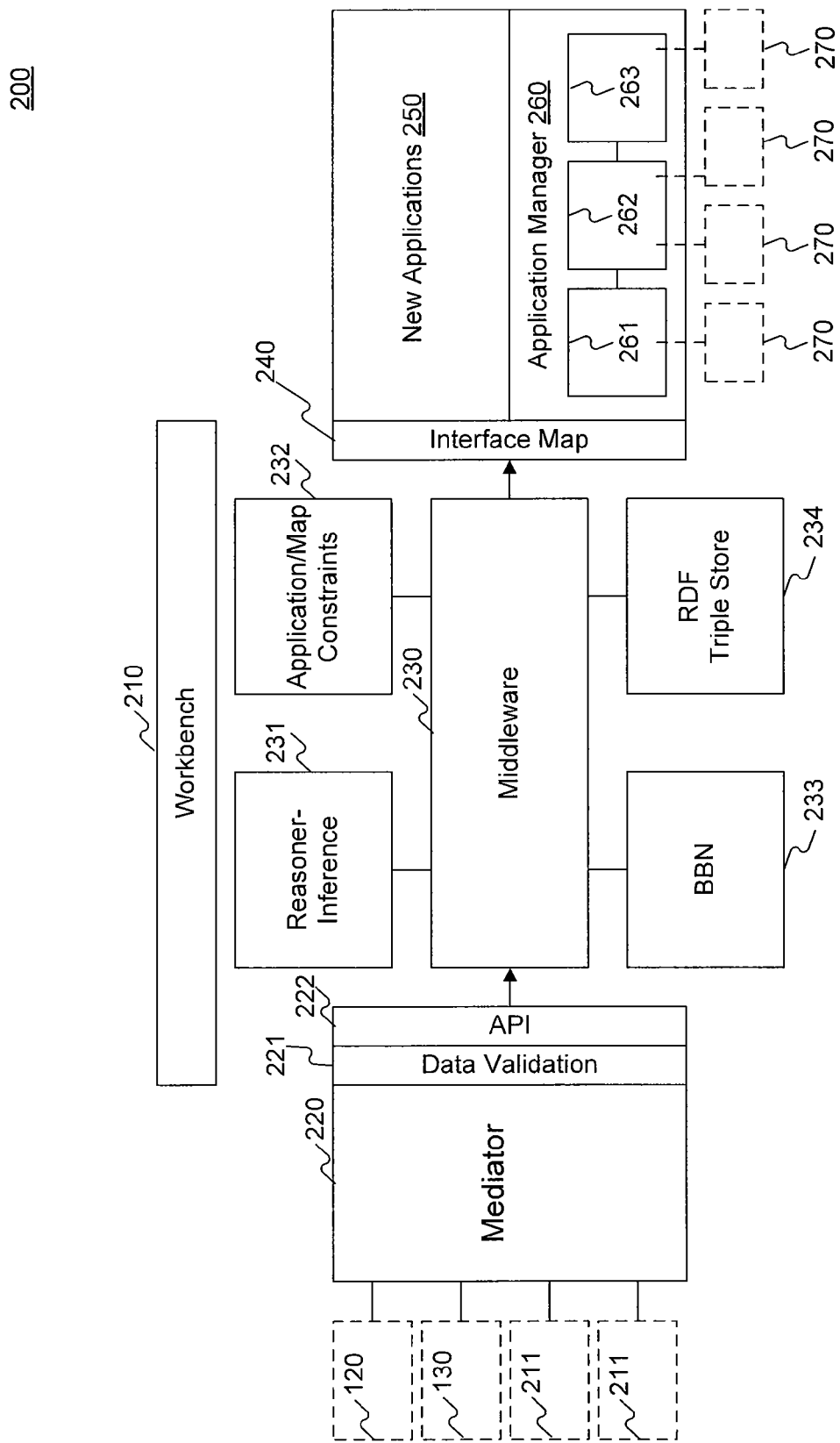
FIG. 2 is a diagram of an exemplary system for enterprise event management in which systems and methods consistent with aspects of the present invention may be implemented.

FIG. 2 is a diagram of an exemplary system 200 for enterprise event management in which systems and methods consistent with aspects of the present invention may be implemented. The components and arrangement of FIG. 2, however, may be varied within principles of the present invention.

System 200 may represent an example of program 154. System 200 includes a workbench 210 that enables the configuration of rules, and manages a pipeline of events, inferences, and actions. Workbench 210 processes instances, configures events that may require the passage of time (e.g., recognizing a missed payment), and enables configuration of new events and actions in the system, including how events are filtered, correlated, mapped to an ontology. Workbench 210 manages rules governing the inferences and the invocation of operational systems to affect system behavior. Further, workbench 210 manages users and roles, e.g. business analysts, system operators, developers, etc.

System 200 also includes mediator 220, which may collect published events from one or more event sources. Event sources may include business systems, operational systems, business intelligence systems, social networking systems, etc., and are described in more detail below with respect to FIG. 3. Events may include, for example, call 120, electronic communication 130, or other events 211. For example, an event may include a customer that contacts a company using the telephone, email, text message, or any other method.

Mediator 220 may, in certain implementations, consolidate multiple related raw events into a single event, so that it is possible to reduce event volume for the rest of system 200. Mediator 220 may correlate raw events into meaningful concepts and add concept tags. Mediator 220 may validate some events, for example using data validation component 221, enrich some events, and ensure that data conforms to a set of well-known event outputs. Mediator 220 may filter, coalesce, and aggregate event data 210, for example to filter data associated with events. In some cases, mediator 220 may also enhance event data. For example, mediator 220 may interface to other systems to gather additional relevant data to put in a message. Mediator 220 may add meta data about a specific message, such as timing data, message type, source system, etc.

API 222 may connect mediator 220 to middleware 230. Middleware 230 communicates with various engines, networks, and data stores, including reasoner-inference engine 231, application/map constraints 232, a Bayesian Belief Network (BBN) 233, and a data store, such as data store Resource Description Framework (RDF) Triple Store 234. RDF Triple Store 234 is a storage optimized for inferencing and understanding relationships between business objects. RDF Triple Store 234 may include a model of concepts including events, business concepts, possible actions, and instance data specific to each customer. Middleware 230 also communicates with interface map 240 to drive new applications 250 and existing applications, for example using an application manager 260. Middleware 230 may comprise any middleware, for example, Wave® Exploitation Framework (Wave-EF). In some embodiments, system 200 may not include any middleware 230, and instead, API 222 may connect mediator 220 to reasoned-inference 231, for example. Application manager 260 may include a gather context engine 261, a verify action engine 262, and a process steps engine 263, which may communicate with existing applications 270, such as enterprise applications.

Figure 3:
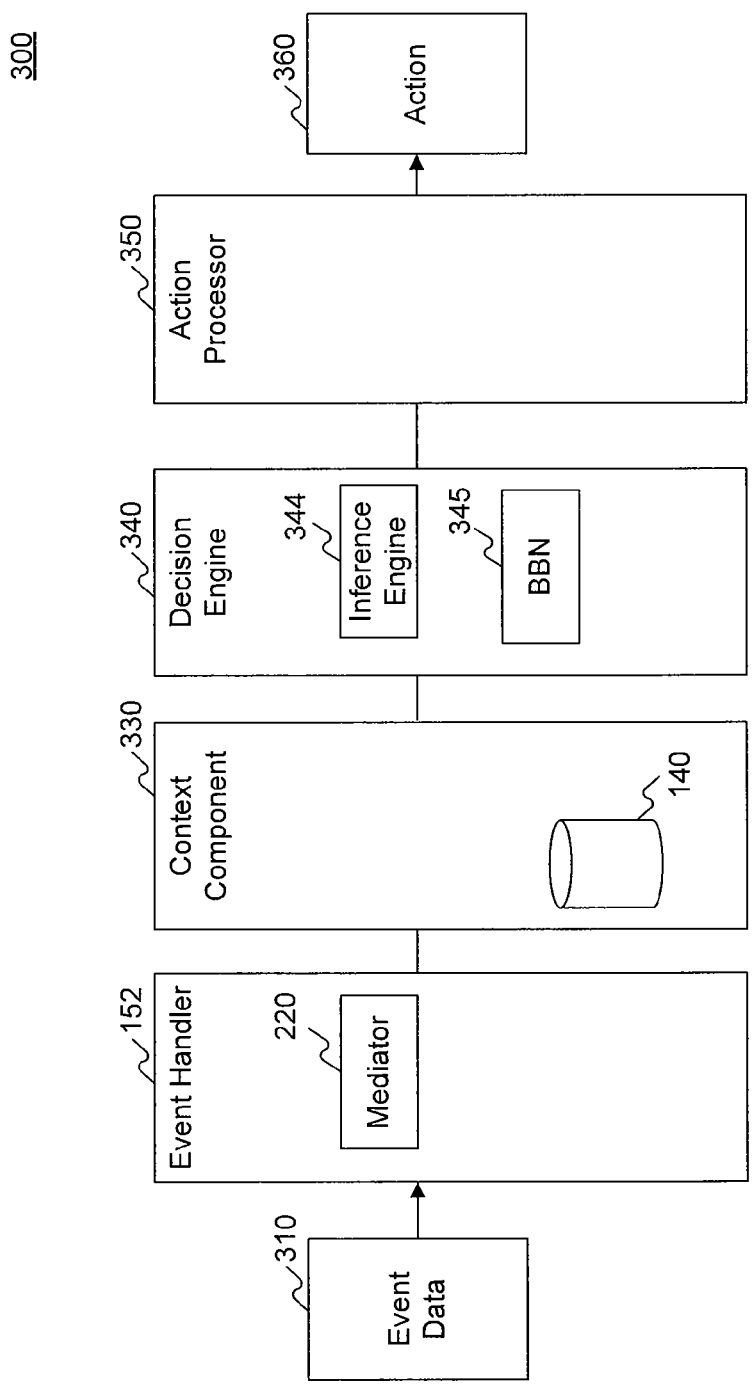
FIG. 3 is a diagram of an exemplary system for preemptive action in which systems and methods consistent with aspects of the present invention may be implemented.

FIG. 3 is a diagram of an exemplary system for preemptive action in which systems and methods consistent with aspects of the present invention may be implemented. The components and arrangement of FIG. 3, however, may be varied within principles of the present invention.

As shown in FIG. 3, system 300 includes event handler 152, context component 330, decision engine 340, action processor 350, and action 360. System 300 represents another example of program 154.

System 300 may connect to computer systems that maintain a customer state, customer information, or transactional information that may impact the customer. For example, these computer systems may be considered event sources, which are systems that publish events (including event data 310). These event sources may include systems both inside and outside a call center enterprise.

These event sources may include: Business Support Systems (BSS). BSS are systems primarily concerned with product sale and management, customer relationships, revenue management, and order management. BSS may work with Operations Support Systems (OSS). OSS are systems concerned with a network, including inventory of network resources, configuring network components, provisioning services across network and customer devices, managing network faults, service level agreements and monitoring, network planning, etc.

Event sources may also include OSS or other systems, including social networks, e.g., Facebook™, MySpace™, Twitter™, as well as blogs, stock systems, Google Earth™, Wikipedia™, or any other system capable of creating events relating to customers.

Event data 310 includes transactions or state changes in these event source systems, which may represent changes or issues associated with a customer. System 300 may easily connect to other computer systems (e.g., operational systems) in a variety of ways, including receiving event data 310, ingesting files, receiving asynchronous messages, interrogating transaction logs, database extractions, and synchronous messaging, for example.

Event handler 152, as described above with respect to FIG. 1, may monitor and handle events, such as call 120 or electronic communication 130. For example, event handler 152 may monitor customer activity, such as any changes in customer information. Event handler 152 may include mediator 220, which was described above with respect to FIG. 2.

Turning back to FIG. 3, context component 330 may combine the data received from event handler 152 into a context specific to a customer. A context for the specified customer may be derived from original messages and may include chronological information, customer preferences, customer personal information, and a possible motivation for calling a call center, for example.

As shown in FIG. 3, context component 330 may include data store 140. Data store 140 may include RDF triple store 234, which was described above with respect to FIG. 2.

Context component 330 may also evaluate data and store higher level business conclusions into data store 140. For example, business conclusions may include subjective information and trend information, for instance whether a customer is a good customer, a worsening customer, or a high value customer. Further, data store 140 may also include probabilistic information, e.g., there is an 80% chance this customer will call because they are having difficulty setting up their cell phone or email, etc. Probabilistic information may be entered by a user, or determined by the system, for example.

Decision engine 340 receives the context which, in some cases, may include a set of predicted motivations and their probabilities. For example, there may be a 70% chance that a specific customer will call about an increased charge on a bill that a business sent to the customer.

Decision engine 240 may use tools such as an inference engine 344 and a Bayesian Belief Network (BBN) 345 to generate conclusions. BBN 345 may be the same as BBN 233, and may be constructed and trained to predict probable call motivations and the specific probability of an occurrence. A prediction may include one or more probable reasons for why a customer is contacting a company, for example. The conclusions generated by decision engine 340 may be used to update data (e.g., RDF triples) in data store 140, or to publish an action message to direct other parts of the system to act, as described in more detail below.

Action processor 350 may take action messages from decision engine 340, gather any context specific to a customer, verify that an action makes sense given a certain context, and forward the appropriate action(s) 360 to action applications, such as new applications 250 or existing applications 270 (see FIG. 2). Action 360 may include any action(s) the rest of the system or another system might perform. Action 360 may represent one or more desired actions that may be taken, for example based upon a company's business policies. These policies may exist in the system as a set of rules. As an example: a set of rules may include rules such as: "If abnormal fee is late fee and customer payment pattern is good or improving and customer value is not low, then credit the fee." In other words, the rule may, if a certain customer's payment pattern is good or improving, credit a fee for that customer even if that customer has an abnormal late fee payment. Alternatively or additionally, the rules may include rules such as: "If abnormal fee is late fee and customer payment pattern is bad or worsening and customer value is not low, then cite customer policy; otherwise create dispute."

Action processor 350 may evaluate the policies with a specific context to determine if the action is appropriate. Action 360 may represent the best action, or set of actions, that may proactively avoid a customer initiated interaction (such as a call to call center 110). Action 360 may be a message or other operation, and may be an initiation of a communication to a customer. Action 360 may include a change to the customer state or any action, including changing customer data, product data, network data, network configurations, handset configuration, set top box configuration, customer preferences, sending customer messages, etc.

In the case where there is a high probability that a customer will initiate contact, a business may configure a set of actions that the business would take, and proactively initiate the actions prior to the customer contact. The actions may alter the state of other computer software systems by initiating transactions. The desired outcome is that the business proactively takes action, and in some cases, notifies the customer of that action.

It may be possible that certain probabilities are related to more than one underlying motivation to prompt action 360. For these cases, action processor 250 may initiate more than one action. If the probability of a call is not sufficiently high to warrant proactive action with a customer, the customer's data may be persisted, and the customer's likely motivation for calling may be pre-computed, so that if the customer does call, the latency of providing the customer's reason(s) for calling (e.g., calling center 110 or a customer service representative) is greatly reduced. An example of how to reduce latency for a customer call is described in more detail below with respect to FIG. 5.

In some cases, action 360 may be broken down to a series of steps. Action processor 350 may execute the steps sequentially, or where the process steps allow, action processor 350 may execute the steps in parallel.

In certain cases, action applications are programs that also provide input to a business system managing a call, an operational system, or another system (e.g., enterprise applications 270). In some cases, new applications 250 may be designed to take action as directed by action processor 350. In other cases, action 360 may be translated to an industry standard process orchestration engine to orchestrate action 360 on operational systems. For example, action 360 may be translated to an industry standard format such as Business Process Execution Language (BPEL).

As further examples, actions 360 may include: moving a customer in or out of collections (e.g., notifying a collector to pursue a debt from a customer, or to cease pursuing the debt), turning a customer's service or part of a customer's service on or off (e.g., turning off a customer's phone service), sending a piece of mail (e.g., a physical mail or e-mail notification), placing a customer in a queue for an outgoing support call, etc.

Figure 4:
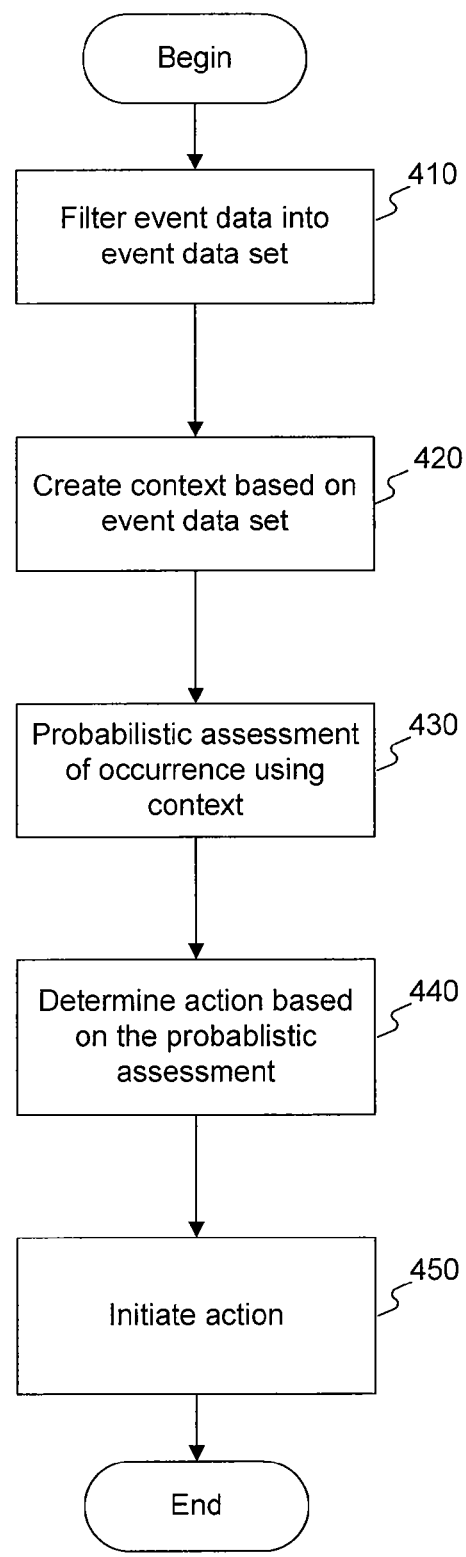
FIG. 4 is a diagram of a process for proactive action to prevent customer contacts in accordance with one implementation consistent with the present invention.

FIG. 4 illustrates a diagram of a process for proactive action to prevent or avoid customer contacts in accordance with one implementation consistent with the present invention. As shown in FIG. 4, event handler 152 may filter event data 310 (which may have been processed by mediator 220), into an event data set (step 410).

Next, context component 330 may create a context based on the event data set received from event handler 152 (step 420). Decision engine 340 makes a probabilistic assessment of an occurrence using the context (step 430) and determines an action based on the probabilistic assessment (step 440). Action processor 350 initiates action 260 (step 450).

As an example, consider a customer who makes a payment on a bill. This bill payment may comprise event data 310, which is handled by event handler 152. In this example, event data 310 includes a payment date and amount paid. Mediator 220 cleans event data 310 (e.g., by filtering out unnecessary data such as dropped calls, and/or by formatting event data into a known format) and forwards the cleaned data to context component 330, which converts the data to one or more RDF triples (subject, predicate, and object) and stores the converted data, for example, in data store 140. The decision engine 340 invokes rules (and, in some cases, inference engine 344 and BBN 345 are used) to evaluate the new data along with data already stored (e.g., in data store 140) about the customer and his account.

Decision engine 340 evaluates whether the customer's payment in this example was early, on time, or late, and given the amount due on the account, was the payment insufficient, adequate, or excessive. Then decision engine 340 may also evaluate the trend of payments for the specific customer and profitability, to conclude if the customer is high, medium, or low value customer.

For example, a customer that has profitable services and always pays his bill on time might qualify as a "high value customer." Each of these conclusions generates action(s) 360 that action processor 350 sends on to action applications, such as new applications 250 or enterprise applications 270. The action applications, which may in these cases be the business support systems (BSS), may store the actions in a database.

As another example, a company may send a customer a bill with an increased charge for a service. A revenue management application within a BSS may publish this event (e.g., through creation of a file that is received by mediator 220, or as event data 310 to event handler 152 and mediator 220). Event data 310 may include the bill's due date and the amount due.

Mediator 220 cleans event data 310 (e.g., by filtering out unnecessary data such as dropped calls, and/or by formatting event data into a known format) and forwards the cleaned data to context component 330, which may convert the data to multiple RDF triples, and store the converted data in data store 140. Decision engine 340 and BBN 345 evaluate the newly stored data, along with any data previously stored about the customer and his account. Any increased charges that exceeds 5% (or some other threshold of the customer's last bill) may generate a prediction that the customer will call about the increased charge.

Decision engine 340 may use additional information about the customer, such as previous calls following a rate increase, to associate a probability to the prediction. These conclusions generate action(s) 360 that action processor 350 sends on to action applications, which may then store the conclusions in the appropriate database (e.g., a BSS database).

Figure 5:
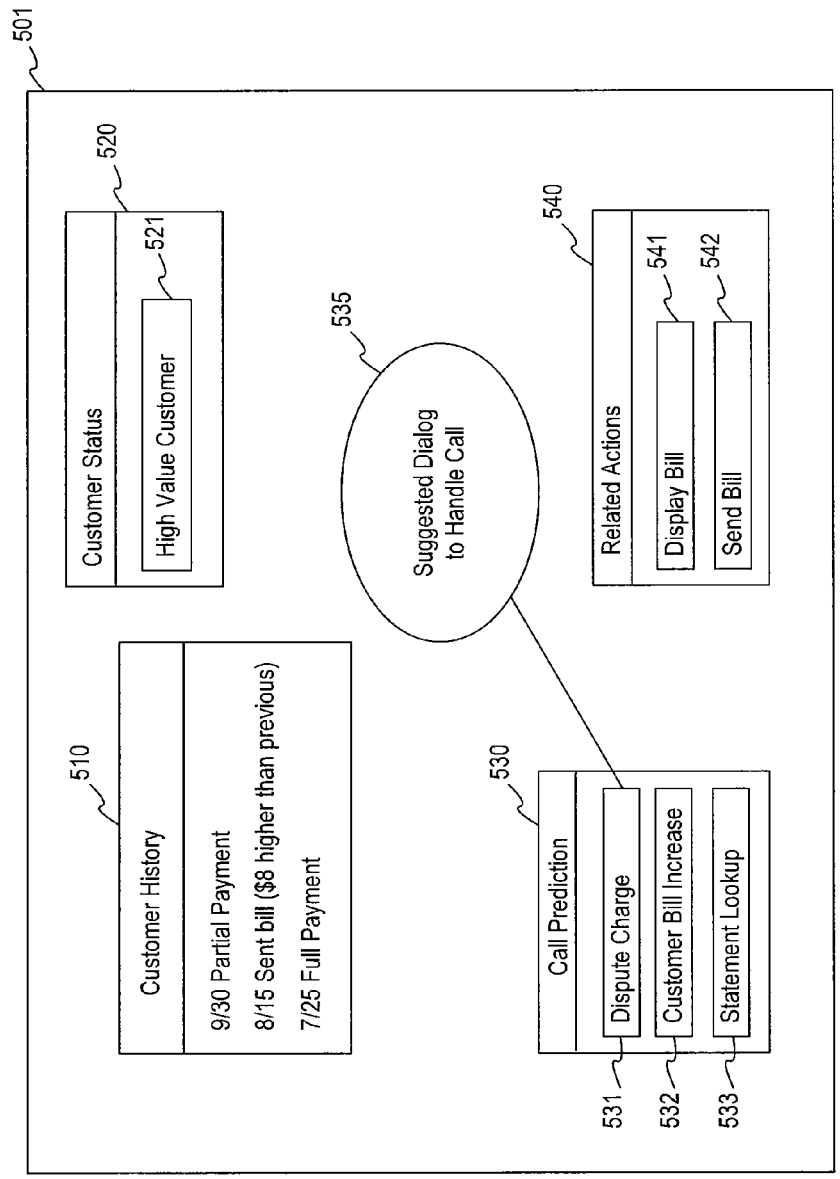
FIG. 5 is a diagram of a user interface for call management in a call center in accordance with one implementation consistent with the present invention.

An example of how a customer service representative or some automated process may react to a call from a customer is described in more detail below with respect to FIG. 5. FIG. 5 is a diagram of a user interface for call management in a call center in accordance with one implementation consistent with the present invention. As shown in FIG. 5, a customer screen 501 may display a customer history 510, customer status 520, call prediction 530, and related actions 540. One skilled in the art will appreciated that many different configurations of customer screen 501 are possible.

Customer history 510 may display a customer history in descending order. In this example, customer history 510 shows a partial payment on September 30, preceded by a sent bill on August 15 that included a billing surprise that was $8.00 higher than normal, and which was preceded by a full payment on July 25.

Using this history, customer screen 501 may present one or more predicted reasons for a call (in descending order) as shown in call prediction window 530: dispute charge 531, customer bill increase 532, or statement lookup 533. In certain examples, call prediction window 530 may include other predictions, e.g., a first customer confusion about a bill.

A selection (e.g., a mouse click) of any of the displayed predictions in call prediction window 530 presents a suggested dialog for the customer service representative to handle the call. For example, a mouse click on the prediction dispute charge 531 may display suggested dialog window 535. Alternatively, an automated process in an IVR may utilize a similar dialog or format for communicating with the customer.

Based on the prediction, customer screen 501 also recommends related actions 540. Related actions 540 may include any number of actions, such as display bill 541 and send bill 542. A selection (e.g., a mouse click) of display bill 541 may present a display of the customer's bill (e.g., in a pop-up window), and a selection of send bill 542 may send an electronic or physical bill to the customer, for example. Related actions 540 may include other actions, e.g., call customer, e-mail customer, process customer dispute, etc.

Customer status window 520 displays the customer status, which in this case is "high value customer" 521. In one example, the system may combine the fact that a customer is having a problem with the subjective conclusion that this is a high value customer to trigger an outbound call to offer the customer assistance.

The example described in FIG. 5 is that of efficiently reacting to a customer's call once it has been made, but customer screen 501 and the other examples described herein are also intended to for use in proactive and preemptive customer care, such as call avoidance, avoiding a customer's complaint via e-mail or other electronic communication, preempting a complaint about a bill or a service, preventing a customer from canceling an account or a service, etc.

Other features will be apparent to those skilled in the art from consideration of the specification and examples disclosed herein. For example, methods and systems consistent with implementations of the present invention may use an up-to-the-second view of all activity about a customer to form a view of what might motivate this customer to contact a company. In certain examples, probabilistic assessments are completed with a complete chronological context. Further, probabilistic assessments may be performed on a specific customer context for a specific customer. The probabilistic assessments may include a context of derived high level business concepts. Business policies may take into account customer motivation, persona, historical, and preference context information as determinants in policy rules. It is intended that the specification and examples be considered as exemplary only.

What is claimed is:

1. A computer-implemented method for managing customer activity in a call center, the method comprising:

monitoring, by a computer system, event data;

filtering, by the computer system, the event data into an event data set associated with a single specific customer;

creating, by the computer system, a context for the single specific customer based on the event data set;

performing, by the computer system, a probabilistic assessment of an occurrence related to the single specific customer, based on the context, wherein the probabilistic assessment of the occurrence is representative of a likelihood that the single specific customer will initiate contact with the call center;

determining, by the computer system, an action based on the probabilistic assessment, wherein the action comprises one of: a phone call to the single specific customer, an electronic communication to the single specific customer, a change to a customer account, and an electronic communication to an operational system; and initiating, by the computer system, the action.

2. The computer-implemented method of claim 1, further comprising translating the action into an industry standard format.

3. The computer-implemented method of claim 1, wherein the context includes chronological information, customer preferences, and a possible motivation for calling.

4. The computer-implemented method of claim 1, wherein the event data represents changes in customer operational systems and comprises one of: a file, an asynchronous message, a transaction log, a database extract, and a synchronous message.

5. The computer-implemented method of claim 1, wherein the event data comprises one of: customer information, bill payment information, and historical information.

6. The computer-implemented method of claim 1, further comprising:

based on the event data, triggering the filtering by the computer system of the event data into the event data set associated with the single specific customer.

7. The computer-implemented method of claim 1, wherein the computer system includes a probabilistic assessment package.

8. A system for managing customer activity in a call center, the system comprising:

an event handler configured to monitor event data;

a mediator configured to filter the event data into an event data set associated with a single specific customer;

a context component configured to create a context for the single specific customer based on the event data set;

a decision engine configured to:

perform a probabilistic assessment of an occurrence related to the single specific customer, based on the context, wherein the probabilistic assessment of the occurrence is representative of a likelihood that the single specific customer will initiate contact with the call center, and determine an action based on the assessment, wherein the action comprises one of: a phone call to the single specific customer, an electronic communication to the single specific customer, a change to a customer account, and an electronic communication to an operational system; and an action processor configured to initiate the action.

9. The system of claim 8, further comprising a translation component configured to translate the action into an industry standard format.

10. The system of claim 8, wherein the context includes chronological information, customer preferences, and a possible motivation for calling.

11. The system of claim 8, wherein the event data represents changes in customer operational systems and comprises one of: a file, an asynchronous message, a transaction log, a database extract, and a synchronous message.

12. The system of claim 8, wherein the event data comprises one of: customer information, bill payment information, and historical information.

13. The system of claim 8, further comprising:

a triggering component configured to trigger, based on the event data, the filtering component to filter the event data.

14. The system of claim 8, further comprising a probabilistic assessment package.

15. A computer-implemented method for preventing customers from contacting a call center, the method comprising:

monitoring, by a computer system, event data;

filtering, by the computer system, the event data into an event data set associated with a single specific customer;

creating, by the computer system, a context for the single specific customer based on the data set;

performing, by the computer system, a probabilistic assessment of the likelihood that the single specific customer will initiate a call to the call center, based on the context, wherein the probabilistic assessment of the occurrence is representative of a likelihood that the single specific customer will initiate contact with the call center;

determining, by the computer system, a preemptive action intended to prevent the single specific customer from initiating the call, based on the probabilistic assessment, wherein the action comprises one of: a phone call to the single specific customer, an electronic communication to the single specific customer, a change to a customer account, and an electronic communication to an operational system; and initiating, by the computer system, the preemptive action.

16. The method of claim 15, wherein the context includes chronological information, customer preferences, and a possible motivation for calling.

17. The method of claim 15, wherein the event data represents changes in the customer operational systems and comprises one of: a file, an asynchronous message, a transaction log, a database extract, and a synchronous message.

* * * * *